United States Patent
Fujito et al.

(10) Patent No.: US 12,216,100 B2
(45) Date of Patent: Feb. 4, 2025

(54) METHOD FOR SEPARATING ODOROUS COMPOUND AND SUPERCRITICAL FLUID CHROMATOGRAPH

(71) Applicant: SHIMADZU CORPORATION, Kyoto (JP)

(72) Inventors: Yuka Fujito, Kyoto (JP); Takeshi Bamba, Fukuoka (JP)

(73) Assignee: SHIMADZU CORPORATION, Kyoto (JP)

( * ) Notice: Subject to any disclaimer, the term of this patent is extended or adjusted under 35 U.S.C. 154(b) by 397 days.

(21) Appl. No.: 17/546,580

(22) Filed: Dec. 9, 2021

(65) Prior Publication Data

US 2023/0184726 A1    Jun. 15, 2023

(51) Int. Cl.
| | |
|---|---|
| *G01N 30/86* | (2006.01) |
| *B01D 15/40* | (2006.01) |
| *B01J 20/26* | (2006.01) |
| *G01N 30/72* | (2006.01) |

(52) U.S. Cl.
CPC ......... *G01N 30/8675* (2013.01); *B01D 15/40* (2013.01); *B01J 20/261* (2013.01); *G01N 30/7233* (2013.01)

(58) Field of Classification Search
None
See application file for complete search history.

(56) References Cited

U.S. PATENT DOCUMENTS

| | | | | |
|---|---|---|---|---|
| 4,966,785 | A * | 10/1990 | Springston | C03C 17/004 427/221 |
| 6,865,926 | B2 * | 3/2005 | O'Brien | G01N 30/22 73/23.42 |
| 7,621,171 | B2 * | 11/2009 | O'Brien | G01N 30/32 73/23.41 |
| 10,866,217 | B2 * | 12/2020 | Yasunaga | G01N 30/20 |
| 11,506,581 | B2 * | 11/2022 | Van de Bittner | G01N 1/405 |
| 11,731,106 | B2 * | 8/2023 | Ishii | G01N 30/56 210/502.1 |

(Continued)

FOREIGN PATENT DOCUMENTS

| | | |
|---|---|---|
| CN | 112098528 A | 12/2020 |
| JP | S60-241908 A | 11/1985 |

(Continued)

OTHER PUBLICATIONS

Apr. 14, 2023, Chinese Office Action issued for related CN Application No. 202010072189.0.

(Continued)

*Primary Examiner* — Peter J Macchiarolo
*Assistant Examiner* — Jermaine L Jenkins
(74) *Attorney, Agent, or Firm* — Paratus Law Group, PLLC (57) ABSTRACT

As a technique for separating odorous compounds by using a supercritical fluid chromatograph, a method for separating an odorous compound is provided which includes a process of carrying a sample containing an odorous compound into a column filled with a packing material made of a polymer having an unsaturated hydrocarbon structure, by a flow of a mobile phase which is a supercritical fluid of a predetermined substance.

8 Claims, 3 Drawing Sheets

(56) References Cited

U.S. PATENT DOCUMENTS

| 11,774,413 | B2 * | 10/2023 | Yamazaki | B01D 15/20 |
| | | | | 210/198.2 |
| 2018/0313795 | A1 * | 11/2018 | Fujito | B01J 20/267 |
| 2021/0116425 | A1 * | 4/2021 | Fujito | G01N 30/08 |
| 2022/0363658 | A1 * | 11/2022 | Cordier | A61K 36/185 |

FOREIGN PATENT DOCUMENTS

| JP | 2015-215320 A | | 12/2015 | | |
| JP | 2017-040536 A | | 2/2017 | | |
| JP | 2018-189441 A | | 11/2018 | | |
| JP | 2018-189449 A | | 11/2018 | | |
| JP | 2020204514 A | * | 12/2020 | | G01N 30/02 |
| JP | 7306090 B2 | * | 7/2023 | | G01N 30/02 |

OTHER PUBLICATIONS

May 30, 2023, Japanese Decision to Grant a Patent issued for related JP Application No. 2019-112010.

Aug. 2, 2022, Japanese Office Action issued for related JP Application No. 2019-112010.

Watanabe, Recent Advances of Synthetic Adsorbents in The Separation and Purification Fields, Adsorption News, 1991, pp. 10-15, vol. 5.

May 7, 2022, Chinese Office Action issued for related CN Application No. 202010072189.0.

Sep. 22, 2022, Chinese Office Action issued for related CN Application No. 202010072189.0.

Jun. 30, 2023, Notification of Granting Invention Patent Right issued for related CN Application No. 202010072189.0.

* cited by examiner

| | STDVB | NH₂ | Phenyl | ODS |
|---|---|---|---|---|
| Hexylacetate | 1.6 | 0.5 | 0.8 | 0.5 |
| Pentylbutylate | 1.9 | 0.5 | 0.8 | 0.5 |
| Furaneol | 2.1 | 4.3 | 1.5 | 0.5 |
| 2,3-dimethylpyradine | 2.2 | 1.3 | 2.7 | 0.8 |
| Pinene | 2.3 | 0.4 | 0.8 | 0.6 |
| Homofuraneol | 2.5 | 4.1 | 1.5 | 0.5 |
| Linalool | 2.6 | 1.8 | 1.1 | 0.6 |
| Camphor | 3.0 | 0.9 | 1.3 | 0.7 |
| Limonene | 3.2 | 0.4 | 0.8 | 0.6 |
| Citral | 3.5 | 1.9 | 2.2 | 0.7 |
| Citronellol | 3.5 | 3.4 | 1.7 | 0.8 |
| Menthol | 3.6 | 2.8 | 1.4 | 0.8 |
| Geraniol | 3.7 | 3.5 | 1.8 | 0.8 |
| Carvone | 4.2 | 1.1 | 1.5 | 0.7 |
| Methyl salicylate | 4.4 | 0.8 | 1.3 | 0.7 |
| γ-decanolacton | 4.8 | 1.9 | 2.2 | 0.7 |
| Eugenol | 6.2 | 3.1 | 1.8 | 0.8 |
| Cinnamaldehyde | 6.5 | 0.9 | 1.8 | 0.8 |
| Vanillin | 7.0 | 6.8 | 3.2 | 1.3 |
| Anethole | 7.1 | 0.8 | 1.4 | 0.9 |
| Nootokatone | 8.4 | 1.9 | 2.7 | 1.2 |
| Coumarin | 9.2 | 3.3 | 3.4 | 1.0 |
| Indole | 12.6 | 5.4 | 3.0 | 1.3 |

$k'$

PRESENT EMBODIMENT / CONVENTIONAL (AMINOPROPYL GROUP) / CONVENTIONAL (PHENYL GROUP) / CONVENTIONAL (OCTADECYL GROUP)

METHOD FOR SEPARATING ODOROUS COMPOUND AND SUPERCRITICAL FLUID CHROMATOGRAPH

TECHNICAL FIELD

The present invention relates to a method for separating an odorous compound and a supercritical fluid chromatograph used for carrying out the same method.

BACKGROUND ART

For an analysis of unknown odorous compounds contained in natural products, gas chromatographs have been conventionally used (for example, see Patent Literature 1). In an analysis of an odorous compound using a gas chromatograph, a sample collected from a natural product is vaporized. The resulting vapor is carried into a column by a flow of carrier gas and is thereby separated from the other compounds. The isolated compound is subjected, for example, to a measurement using a nuclear magnetic resonance (NMR) apparatus for a structural analysis.

A capillary column commonly used in a gas chromatograph consists of a thin tube with a stationary phase applied to its inner surface. In this type of capillary column, only a small amount of compound can be adsorbed on the stationary phase. NMR requires at least a few micrograms of sample for one measurement, whereas the amount of compound that can be isolated by a gas chromatograph at one time is a few nanograms. Accordingly, when a gas chromatograph is used, the separation process must be repeated many times to obtain the required amount of compound for the structural analysis by NMR.

To address this problem, in recent years, analyses using supercritical fluid chromatographs have been tested. Supercritical fluid chromatographs use a supercritical fluid of carbon dioxide (or other substances) as a mobile phase. A mobile phase into which a sample has been injected is introduced into a packed column filled with a packing material which contains a stationary phase, to separate compounds. Since the supercritical fluid having a low level of viscosity and high level of diffusivity is used as the mobile phase, supercritical fluid chromatographs can separate a large amount of compound at one time by a packed column while maintaining similar advantages to gas chromatographs, i.e., the high flow velocity and high resolving power.

Due to the use of a supercritical fluid as a mobile phase, the passages inside the supercritical fluid chromatograph must be maintained at a high level of pressure. This means that the column must be resistant to pressure and also have a low degree of swelling for the supercritical fluid. Accordingly, silica-gel-based columns which satisfy those requirements have been widely used in supercritical liquid chromatographs. A "silica-gel-based column" means a type of column filled with a packing material which consists of silica gel on which a specific kind of functional group selected according to the properties of the target compound is fixed as the stationary phase by chemical modification. For example, Patent Literature 2 discloses a silica-gel-based column in which silica gel is chemically modified with an octadecyl group (or other functional groups) as the stationary phase.

CITATION LIST

Patent Literature
Patent Literature 1: JP 2017-40536 A
Patent Literature 2: JP 2015-215320 A
Patent Literature 3: JP 2018-189441 A
Patent Literature 4: JP 2018-189449 A

SUMMARY OF INVENTION

Technical Problem

Patent Literature 2 shows an example in which vitamins were separated by a supercritical fluid chromatograph using a silica-gel-based column. However, a test of the separation of odorous compounds by a supercritical fluid chromatograph using a silica-gel-based column has revealed that the device cannot satisfactorily separate odorous compounds.

The problem to be solved by the present invention is to provide a technique for separating odorous compounds by using a supercritical fluid chromatograph.

Solution to Problem

A method for separating an odorous compound according to the present invention developed for solving the previously described problem includes a process of carrying a sample containing an odorous compound into a column filled with a packing material made of a polymer having an unsaturated hydrocarbon structure, by a flow of a mobile phase which is a supercritical fluid of a predetermined substance.

A supercritical fluid chromatograph according to the present invention developed for solving the previously described problem includes:
  an odorous compound database in which measurement data of a plurality of odorous compounds, acquired by a predetermined measurement technique, are recorded:
  a column filled with a packing material made of a polymer having an unsaturated hydrocarbon structure;
  a supercritical fluid supply section configured to supply the column with a supercritical fluid of a predetermined substance;
  a sample injection section located in a passage extending from the supercritical fluid supply section to the column, and configured to inject a sample into the supercritical fluid;
  a measurement section configured to sequentially perform a measurement of an effluence from the column by the predetermined measurement technique, and
  an odorous compound identification section configured to identify an odorous compound contained in the effluence by comparing measurement data acquired by the measurement with the measurement data recorded in the odorous compound database.

Advantageous Effects of Invention

The odorous compound can be defined, for example, as a compound having an unsaturated hydrocarbon structure in a chain or cyclic form with a molecular weight equal to or less than 800. Odorous compounds are weakly polarized due to their unsaturated hydrocarbon structure in a chain or cyclic form. Furthermore, most of them are low-molecular compounds with molecular weights equal to or less than 800. Therefore, odorous compounds exhibit weak intermolecular bonds and are volatile. Accordingly, they can also be defined as volatile low-molecular compounds.

The unsaturated hydrocarbon structure may exclusively include either a chain structure or cyclic structure, or it may include both structures.

In the method for separating an odorous compound and a supercritical fluid chromatograph according to the present invention, a column filled with a packing material made of a polymer having an unsaturated hydrocarbon structure is used to separate an odorous compound. A likely reason for the past failure of the separation of odorous compounds by the silica-gel-based column is that the low-molecular odorous compounds introduced into the column along with the highly diffusive supercritical fluid penetrate the stationary phase and reach the surface of the silica gel, causing an undesirable interaction with the highly polar silanol group which is present on the surface of the silica gel. To solve this problem, the present invention uses a column filled with a packing material, as the stationary phase, made of a polymer of a compound having an unsaturated hydrocarbon structure. In other words, the entire packing material functions as the stationary phase and includes no functional group that would cause an undesirable interaction, so that the odorous compounds can be satisfactorily separated.

DESCRIPTION OF EMBODIMENTS

One embodiment of the method for separating an odorous compound and the supercritical fluid chromatograph (SFC) according to the present invention is hereinafter described with reference to the drawings.

Figure 1:
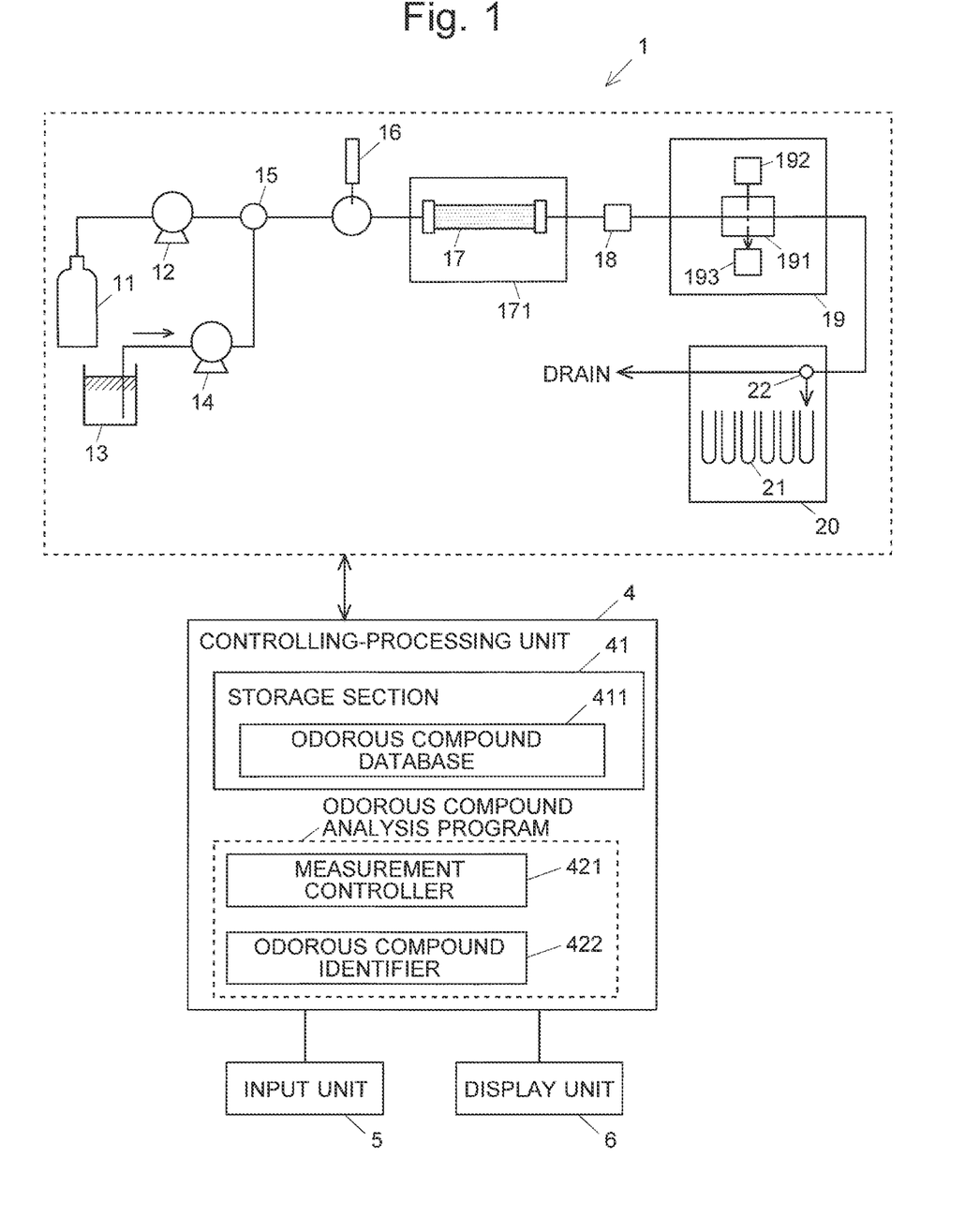
FIG. 1 is a configuration diagram of the main components of one embodiment of the supercritical fluid chromatograph according to the present invention.

FIG. 1 is a configuration diagram of the main components of the supercritical fluid chromatograph according to the present embodiment. This supercritical fluid chromatograph 1 includes a cylinder 11 containing a mobile-phase material, a pressure pump 12, a liquid container 13 containing a modifier solution to be added to the mobile phase, a pump 14, a mixer 15, a sample injector 16, a column 17, a backpressure control valve 18, a spectrometric detector 19, and a fraction collector 20. A controlling-processing unit 4 configured to control operations of these components is also provided.

The cylinder 11 contains carbon dioxide as the material of the mobile phase. The liquid container 13 contains methanol as the modifier. The passage between the pressure pump 12 and the backpressure control valve 18 is maintained at a pressure and temperature under which carbon dioxide becomes a supercritical fluid. The column 17 is contained in a column oven 171 and maintained at a predetermined temperature. The column 17 in the present embodiment is packed with beads made of a polymer of styrene and divinylbenzene as the packing material. Details of the column 17 will be described later.

The spectrometric detector 19 includes a flow cell 191 into which a sample liquid exiting from the column 17 is introduced, a lamp 192 configured to irradiate the sample liquid passing through the flow cell 191 with a predetermined range of wavelengths of light, and a photodetector 193 configured to disperse the light which has passed through the flow cell 191 into a range of wavelengths and measure the intensity of light at each wavelength.

The fraction collector 20 is configured to collect a fraction of the odorous compound based on the detection result obtained by the spectrometric detector 19. It includes fraction containers 21 and a collector unit 22 configured to collect a fraction of the effluence from the spectrometric detector 19 into each fraction container 21. The effluence which has passed through the collector unit 22 is discharged to the drain.

The controlling-processing unit 4 includes a storage section 41 including an odorous compound database 411, as well as a measurement controller 421 and an odorous compound identifier 422 as functional blocks. The controlling-processing unit 4 is actually a personal computer, on which the aforementioned functional blocks are embodied by executing an odorous compound analysis program previously installed on the computer. An input unit 5, which includes a keyboard and mouse, and a display unit 6 are connected to the controlling-processing unit 4.

The odorous compound database 411 holds information for each of a plurality of known odorous compounds, the information including the name of the odorous compound and an absorption spectrum acquired beforehand with the spectrometric detector 19. The measurement conditions for the measurement of the odorous compounds (e.g., the type and temperature of the column, as well as the kind and flow velocity of the mobile phase) are also stored in the database.

A user issues a command to initiate the measurement of odorous compounds. Then, the measurement controller 421 displays, on the display unit 6, a screen for allowing the user to select measurement targets from the odorous compounds registered in the odorous compound database 411. The user selects odorous compounds as the target compounds by an appropriate operation. The measurement controller 421 reads the information of the absorption spectra of the compounds and their measurement conditions from the odorous compound database 411.

Next, the measurement controller 421 heats the column 17 to the predetermined temperature based on the measurement conditions read from the odorous compound database 411. After the column 17 has been heated to that temperature, the measurement controller 421 begins operating the pressure pump 12 to supply carbon dioxide from the cylinder 11 at a predetermined flow rate while compressing it to a predetermined pressure based on the measurement conditions. The carbon dioxide is supplied in a supercritical state within the passage between the pressure pump 12 and the backpressure control valve 18.

Meanwhile, the pump 14 is operated so that methanol contained in the liquid container 13 is supplied at a predetermined flow rate. The carbon dioxide and methanol are mixed together by the mixer 15. The sample injector 16 injects a sample into the flow of the mobile phase which consists of the mixture of the carbon dioxide and methanol. The sample in the present embodiment contains a plurality of odorous compounds.

The sample injected into the mobile phase is carried into the column 17 by the flow of the mobile phase. Within the column 17, the compounds in the sample interact with the stationary phase in the column 17. Through this process, the compounds are temporally separated from each other according to the strength and frequency of the interaction with the stationary phase, and ultimately exit from the column 17.

The compounds which have exited from the column 17 are sequentially introduced through the backpressure control valve 18 into the spectrometric detector 19. In the spectrometric detector 19, a predetermined range of wavelengths of light is continuously cast from the lamp 192 into the flow cell 191 from the beginning to the end of the measurement. The intensity of the light transmitted through the flow cell 191 is measured with the photodetector 193 at each wavelength and at predetermined intervals of time. The intensity of light measured by the photodetector 193 at each wavelength is sequentially recorded in the storage section 41.

Every time a set of measurement data is saved in the storage section 41, the odorous compound identifier 422 creates an absorption spectrum and compares it with each of the absorption spectra read from the odorous compound database 411 for the odorous compounds selected as the measurement targets. If the two spectra have been identified as identical with a degree of certainty equal to or higher than a predetermined level, the measurement controller 421 sends the fraction collector 20 a control signal for collecting a fraction of the odorous compound concerned. Furthermore, the odorous compound identifier 422 sequentially determines whether or not a significant difference has occurred in the absorption spectrum. An occurrence of an absorption spectrum having no matching spectrum in the odorous compound database 411 yet showing a significant difference suggests that an unknown odorous compound is potentially flowing out of the column 17. Accordingly, the measurement controller 421 similarly sends the fraction collector 20 the control signal for collecting the effluence from the column 17 when it has been determined that a significant difference has occurred in the absorption spectrum.

Upon receiving from the measurement controller 421 the control signal for the collection of a fraction, the fraction collector 20 collects a fraction of the odorous compound (or an effluence that potentially contains an unknown odorous compound) into one of the fraction containers 21 at the timing when the compound or effluence reaches the collector unit 22. After the collection of a fraction of one odorous compound or effluence has been completed, the collector unit 22 moves to the position of the next fraction container 21 on the downstream side and waits for a control signal from the measurement controller 421. Thus, fractions of the desired odorous compounds as well as unknown ones are sequentially collected in the fraction containers 21. The effluence which has flowed out of the flow cell 191 of the spectrometric detector 19 and passed through the collector unit 22 is discharged to the drain. The description so far has assumed that both the odorous compounds as the measurement targets and unknown odorous compounds (or effluences that may be odorous compounds) should be collected. It is also possible to collect only one of the two types of targets depending on the purpose of the measurement.

Hereinafter, the description will be focused on the column 17 used in the method for separating an odorous compound and the supercritical fluid chromatograph according to the present embodiment.

In a silica-gel-based column widely used for supercritical fluid chromatography, the silanol group, which is highly polar, is present on the surface of the silica gel chemically modified with a functional group. When an odorous compound, which is a low-molecular compound, is introduced with a highly diffusive supercritical fluid, the compound penetrates the stationary phase and reaches the surface of the silica gel, causing an undesirable interaction with the silanol group on the surface of the silica gel. It is most likely due to this undesirable interaction that the conventional attempt to separate odorous compounds with the silica-gel-based column has been unsuccessful.

Odorous compounds normally have an unsaturated hydrocarbon structure in a chain or cyclic form. Therefore, it is effective to use a compound having an unsaturated hydrocarbon structure as the stationary phase. One of the present inventors, who proposed a column packed with beads made of a polymer having an unsaturated hydrocarbon structure in Patent Literatures 3 and 4 (those beads are hereinafter called the "polymer beads"), have considered that this column should also be effective for the separation of odorous compounds. That is to say, they considered that the use of the polymer beads as the packing material would make it difficult for the undesirable interaction between the target odorous compound and the packing material to take place, so that the resulting peak would be sharper than in the case of using silica gel or chemically modified silica.

Examples of the materials of the polymer beads to be used as the packing material of the column 17 include acrylic polymers, styrenic polymers, polyacrylamide polymers and cellulosic polymers. The polymer beads to be used as the packing material in a supercritical fluid chromatograph using a supercritical fluid of carbon dioxide as a mobile phase must be resistant to pressure since the column 17 located in the analysis passage will be subjected to a pressure that exceeds the critical pressure of carbon dioxide (7.4 MPa). Furthermore, the polymer beads must be highly resistant to solvents so as not to swell or shrink even when the mixture ratio of the carbon dioxide and the modifier is varied. Accordingly, a material with a low degree of swelling for solvents is preferable for the polymer beads.

The polymer beads used as the column-packing material should preferably contain a cross-linked polymer. The polymer beads should preferably have a degree of swelling that does not exceed 1.4 when they absorb tetrahydrofuran as well as when they absorb methanol. The use of polymer beads with such a low degree of swelling provides a satisfactory peak shape. Such a type of polymer beads is also highly durable, so that a satisfactory result is likely to be obtained even when the analysis is repeated multiple times. Furthermore, the polymer beads with a low degree of swelling allows the pressure for filling the column with the beads to be sufficiently high, which can prevent a decrease in the performance of the analysis by a supercritical fluid chromatograph. Among the substances commonly used as the mobile phase, tetrahydrofuran is a substance that is particularly likely to cause a resin material to swell. Methanol is a substance widely used as a modifier. Accordingly, the use of polymer beads having a low degree of swelling for these two substances as the packing material allows measurements to be performed using a variety of mobile phases (including those which have a modifier added).

The degree of swelling of the polymer beads is determined from a change in the volume of the polymer beads before and after their dispersion in a solvent. The degree of swelling of the polymer beads for absorption of tetrahydrofuran as well as for absorption of methanol should preferably be 1.3 or lower, and more preferably 1.2 or lower. The degree of swelling is normally 1.0 or higher.

The average particle size of the polymer beads may be 10 µm or smaller, 5 µm or smaller, or 4 µm or smaller from the viewpoint that a column with a high number of theoretical plates can be easily obtained. On the other hand, the average particle size of the polymer beads may be 1 µm or larger, or 2 µm or larger from the viewpoint that an excessive increase in column pressure should be prevented when the column is in use.

From the viewpoint that the number of theoretical plates of the column should be larger, the value of the coefficient of variation (CV), which is an index representing the degree of variance of the particle size (diameter) of the polymer beads, should be low; for example, it may be 25% or lower, 20% or lower, 15% or lower, or 10% or lower. Although there is no specific limitation on the lower limit of the CV value, the value is normally 1% or higher. Polymer beads may be classified through an appropriate sieve or similar device with the aim of controlling the average particle size and CV values or for other purposes.

There is the tendency that the higher the degree of cross-linking of the polymer is, the lower the degree of swelling of the polymer beads becomes. The degree of cross-linking of the cross-linked polymer contained in the polymer beads is, for example, 50% or higher, 80% or higher, or 90% or higher. If the degree of cross-linking is within any of the previously mentioned ranges, the beads will be hardly affected by the supercritical fluid and improve the performance of the analysis. The degree of cross-linking of a cross-linked polymer is the content ratio of the cross-linked monomer in the monomer used for the polymerization and is defined as the ratio of the mass of the cross-linked monomer to the entire mass of the polymerizable monomer.

A cross-linked monomer is a compound having two or more polymerizable functional groups. Examples include: divinyl compounds, such as divinylbenzene, divinyl biphenyl and divinyl naphthalene; diallyl phthalate and its isomers; triallyl isocyanurate and its derivatives; and polyfunctional (meta)acrylic esters. Each kind of cross-linked monomer may be singly used, or two or more of them may be combined. Examples of the polyfunctional (meta)acrylic esters include di(meta)acrylic esters and (meta)acrylic esters with three or more functional groups.

An example of the di(meta)acryl ester is alkane diol di(meta)acrylate having two (meta)acrylates bonded to an alkylene group. The carbon number of the alkylene group may be within a range of 1-20, or 1-5, for example. The alkylene group may be linear, branched or cyclic in shape. The alkylene group may have a substituent group, such as a hydroxy group.

Examples of the alkane diol di(meta)acrylates include 1,3-butane diol diacrylate, 1,4-butane diol di(meta)acrylate, 1,5-pentane diol di(meta)acrylate, 1,6-hexane diol di(meta)acrylate, 1,7-heptane diol di(meta)acrylate, 1,8-octane diol di(meta)acrylate, 3-methyl-1,5-pentane diol di(meta)acrylate, 1,9-nonane diol di(meta)acrylate, 1,10-decane diol di(meta)acrylate, neopentyl glycol di(meta)acrylate, and glycerol di(meta)acrylate.

Other examples of the di(meta)acrylic esters include: di(meta)acrylates, such as ethoxylated bisphenol A di(meta)acrylate, propoxylated ethoxylated bisphenol A di(meta)acrylate, tricyclodecane dimethanol di(meta)acrylate, 1,1,1-trishydroxy methyl ethane di(meta)acrylate, and ethoxylated cyclohexane dimethanol di(meta)acrylate; and (poly)alkylene glycolic di(meta)acrylate, such as (poly)ethylene glycol di(meta)acrylate, (poly)propylene glycol di(meta)acrylate, and (poly)tetramethylene glycol di(meta)acrylate.

Examples of the (meta)acrylates with three or more functional groups include trimethylolpropane tri(meta)acrylate, tetramethylolmethane tri(meta)acrylate, tetramethylolpropane tetra(meta)acrylate, pentaerythritol tri(meta)acrylate, 1,1,1-trishydroxymethylethane tri(meta)acrylate and 1,1,1-trishydroxymethylpropane triacrylate.

Among these cross-linked monomers, for example, one or more monomers selected from a group consisting of divinylbenzene and di(meta)acrylic esters may be used since a polymer with a high cross-linking density (a polymer in which structures originating from polyfunctional monomers are included at a high ratio) can be easily obtained, and the degree of swelling of the polymer beads can be lowered. In other words, the cross-linked polymer may include a structural unit originating from divinylbenzene and/or a structural unit originating from a di(meta)acrylic ester.

Monofunctional monomers may be used with the cross-linked monomer. Examples of the monofunctional monomers include: monofunctional (meta)acrylates, such as methyl acrylate, ethyl acrylate, propyl acrylate, n-butyl acrylate, isobutyl acrylate, hexyl acrylate, 2-ethylhexyl acrylate, n-octyl acrylate, dodecyl acrylate, lauryl acrylate, stearyl acrylate, 2-chloroethyl acrylate, phenyl acrylate, α-chloroacrylic acid methyl ester, methyl methacrylate, ethyl methacrylate, propyl methacrylate, n-butyl methacrylate, isobutyl methacrylate, hexyl methacrylate, 2-ethylhexyl methacrylate, n-octyl methacrylate, dodecyl methacrylate, lauryl methacrylate, and stearyl methacrylate; styrene and its derivatives, such as styrene, o-methyl styrene, m-methyl styrene, p-methyl styrene, α-methyl styrene, o-ethyl styrene, m-ethyl styrene, p-ethyl styrene, 2,4-dimethyl styrene, p-n-butyl styrene, p-t-butyl styrene, p-n-hexyl styrene, p-n-octyl styrene, p-n-nonyl styrene, p-n-decyl styrene, p-n-dodecyl styrene, p-methoxy styrene, p-phenyl styrene, p-chlorostyrene, and 3,4-dichlorostyrene; vinyl esters, such as vinyl acetate, vinyl propionate, vinyl benzoate and vinyl butyrate; N-vinyl compounds, such as N-vinylpyrrole, N-vinylcarbazole, N-vinylindole and N-vinylpyrrolidone; fluoride-containing monomers, such as vinyl fluoride, vinylidene fluoride, tetrafluoroethylene, hexafluoropropylene, trifluoroethyl acrylate, and tetrafluoropropyl acrylate; and conjugated diene, such as butadiene and isoprene. These monomers can be singly used, or two or more of them may be combined.

Each polymer bead may be entirely made of a cross-linked polymer, or they may partially have a cross-linked polymer. In order to lower the degree of swelling, the cross-linked polymer should preferably be contained at least in the outer layer of the polymer bead. For example, a polymer bead having a cross-linked polymer in its outer layer can be obtained by seed polymerization.

The number of theoretical plates of a column normally tends to increase with a decrease in the particle diameter of the beads. In general, in some cases, it is difficult for the polymer beads to form particles with small diameters as compared to silica gel or other packing materials. The seed polymerization method facilitates the formation of particles with small diameters.

Seed polymerization is a method in which seed particles are made to swell and absorb a polymerizable monomer in an emulsified liquid containing the polymerizable monomer, and the polymerization of the polymerizable monomer is subsequently performed. Examples of the seed particles include (meta)acrylate particles and styrene particles.

The (meta)acrylate particles can be obtained by the polymerization of a (meta)acrylic ester. An example of the (meta)acrylate ester is the previously mentioned (meta)acrylic esters having a linear or branched alkylene group. The styrene particle can be obtained, for example, by the polymerization of styrenic monomers, such as styrene, p-methyl styrene, p-chlorostyrene, chloromethyl styrene, and α-methyl styrene. As the monomers for obtaining seed particles, allyl alcohol, allyl phthalate, allyl ether or similar substance may be combined, other than the (meta)acrylic ester and styrenic monomers mentioned earlier. These monomers can be singly used, or two or more of them may be combined.

The seed particles can be synthesized, for example, by emulsion polymerization, soap-free emulsion polymerization, dispersion polymerization or other commonly known methods, using the aforementioned monomers. The average particle size of the seed particles can be adjusted according to the design particle size of the polymer beads to be obtained. From the viewpoint that the absorption time of the polymerizable monomer should be shortened, the average particle size of the seed particles may be 2.0 μm or smaller, or 1.5 μm or smaller, for example. From the viewpoint that seed particles with an approximately uniform and spherical shape should be efficiently obtained, the average particle size of the seed particles may be 0.1 μm or larger, or 0.5 μm or larger, for example. From these viewpoints, the average particle size of the seed particles should preferably be within a range of 0.1-2.0 μm, more preferably within a range of 0.5-2.0 μm, and still preferably within a range of 0.5-1.5 μm.

The CV value of the seed particles may be 10% or lower, or 7% or lower, for example, from the viewpoint that a satisfactory degree of uniformity of the obtained polymer beads should be ensured. The CV value of the seed particles is normally equal to or higher than 1%.

The average particle size of the polymer beads may be controlled, for example, so as to be 2-10 times, or 2.5-7 times the average particle size of the seed particles. By controlling the average particle size of the polymer beads to be within the previously mentioned ranges, the particle size of the polymer beads will be monodispersed, so that the CV value of the particle size will be small.

Seeds particles are added to an emulsified liquid containing a polymerizable monomer and aqueous medium to make the seed particles absorb the polymerizable monomer, and the polymerization of the polymerizable monomer is subsequently performed to obtain the polymer beads. The emulsified liquid can be prepared by a commonly known method. For example, the polymerizable monomer is added to the aqueous medium and dispersed in the same medium by means of a fine emulsifier, such as a homogenizer, ultrasonic processor or nanomizer, to obtain the emulsified liquid. The aqueous medium may be water or a mixed medium of water and water-soluble solvent (e.g., lower alcohol). The aqueous medium may contain a surfactant. As the surfactant, any of the anionic, cationic, non-ionic and zwitterionic surfactants may be used.

The emulsified liquid may contain a polymerization initiator, such as an organic peroxide or azo compound, as needed. For example, 0.1-7.0 parts by mass of the polymerization initiator can be used for 100 parts by mass of the polymerization monomer.

The emulsified liquid may contain a macromolecular dispersion stabilizer, such as polyvinyl alcohol or polyvinyl pyrrolidone, in order to improve the dispersion stability of the seed particles. For example, 1-10 parts by mass of the macromolecular dispersion stabilizer can be used for 100 parts by mass of the polymerization monomer.

The emulsified liquid may contain a water-soluble polymerization inhibitor, such as a nitrite, sulfite, hydroquinone, ascorbic acid, water-soluble vitamin B, citric acid or polyphenol. The polymerization inhibitor prevents the emulsion polymerization of the monomer in the emulsified liquid.

The seed particles may be directly added to the emulsified liquid, or they may be added in the form of being dispersed in an aqueous dispersion. For example, an emulsified liquid to which seed particles have been added can be stirred at room temperature for 1-24 hours to make the seed particles absorb the polymerizable monomer. Heating the emulsified liquid to 30-50 degrees Celsius tends to promote the absorption of the polymerization monomer.

The mixture ratio of the polymerizable monomer to the seed particles is not specifically limited. For example, from the viewpoint of the efficient production of polymer beads having a desired average particle size, the mixture ratio may be 800 parts by mass or higher, or 1,500 parts by mass or higher, to 100 parts by mass of the seed particles. On the other hand, for example, the mixture ratio of the polymerizable monomer may be 100,000 parts by mass or lower, or 35,000 parts by mass or lower, to 100 parts by mass of the seed particles, from the viewpoint of the efficient production of polymer beads having an intended average particle size while preventing spontaneous suspension polymerization of the polymerizable monomer in the aqueous medium. The seed particles swell due to the absorption of the polymerizable monomer. Accordingly, whether or not the absorption of the polymerizable monomer into the seed particles has completed can be determined by monitoring an increase in the particle diameter of the seed particles through an optical microscope.

Polymer beads are obtained by polymerizing the polymerizable monomer absorbed in the seed particles. The polymerization conditions are not specifically limited and may be appropriately selected according to the kind of monomer and other related factors. After the completion of the polymerization, the aqueous medium is removed from the polymerization liquid by centrifugal separation or filtration as needed. The remnant is washed with water and a solvent, and then dried to isolate the polymer beads.

The polymer beads may have a porous structure. For example, porous beads can be obtained by promoting phase separation in the seed polymerization process by using an organic solvent that is insoluble or hardly soluble in the aqueous medium.

According to the present invention, the separation and analysis of a sample can be performed in a similar manner to those performed by a conventional supercritical fluid chromatograph except that the predetermined polymer beads are used as the packing material for the separation column. The configuration of the supercritical fluid chromatograph is not limited to the one shown in FIG. 1.

The solvent to be used for filling the column with the polymer beads is not specifically limited as long as the polymer beads can be dispersed in that solvent. Examples include water, methanol, THF, acetonitrile, chloroform, ethylene glycol and liquid paraffin. The pressure for filling the column with the polymer beads may be controlled to be 10 MPa or higher, or 15 MPa or higher, for example. Increasing the filling pressure reduces the tailing of the peak in the supercritical fluid chromatogram, so that a satisfactory peak shape is likely to be obtained. From the viewpoint of the prevention of an alteration of the polymer beads or breakage of the column, the filling pressure may be controlled to be 60 MPa or lower, or 50 MPa or lower, for example.

Next, the results of experiments are described in which 23 kinds of odorous compounds were separated by using a conventional supercritical fluid chromatograph (including a silica-gel-based column) as well as a supercritical fluid chromatograph according to the present embodiment (including a column filled with polymer beads of styrene and divinylbenzene as the packing material).

Figure 2:
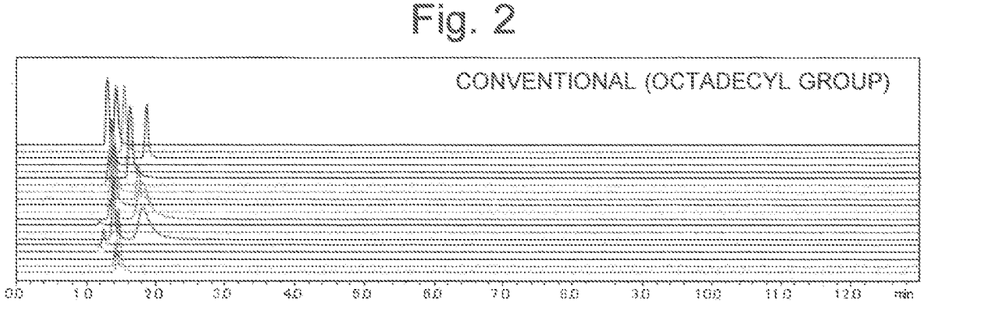
FIG. 2 is a chromatogram showing the result of the separation of odorous compounds by a supercritical fluid chromatograph including a column packed with silica gel chemically modified with an octadecyl group.
Figure 3:
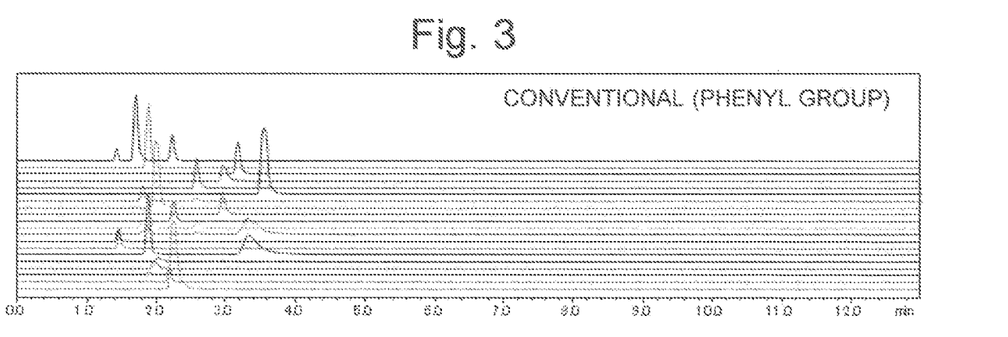
FIG. 3 is a chromatogram showing the result of the separation of odorous compounds by a supercritical fluid chromatograph including a column packed with silica gel chemically modified with a phenyl group.
Figure 4:
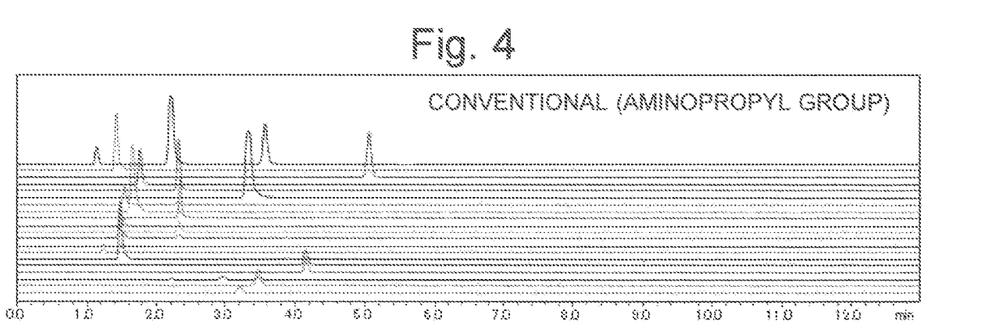
FIG. 4 is a chromatogram showing the result of the separation of odorous compounds by a supercritical fluid chromatograph including a column packed with silica gel chemically modified with an aminopropyl group.
Figure 5:
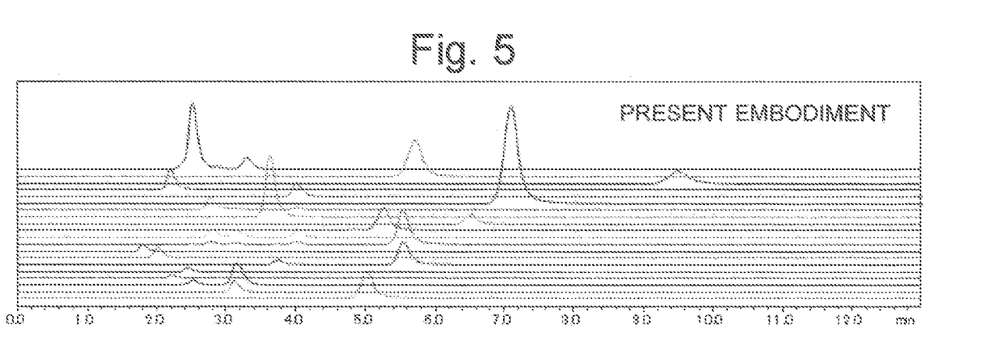
FIG. 5 is a chromatogram showing the result of the separation of odorous compounds by the supercritical fluid chromatograph according to the present embodiment in which one embodiment of the method for separating an odorous compound according to the present invention was performed.
Figure 6:
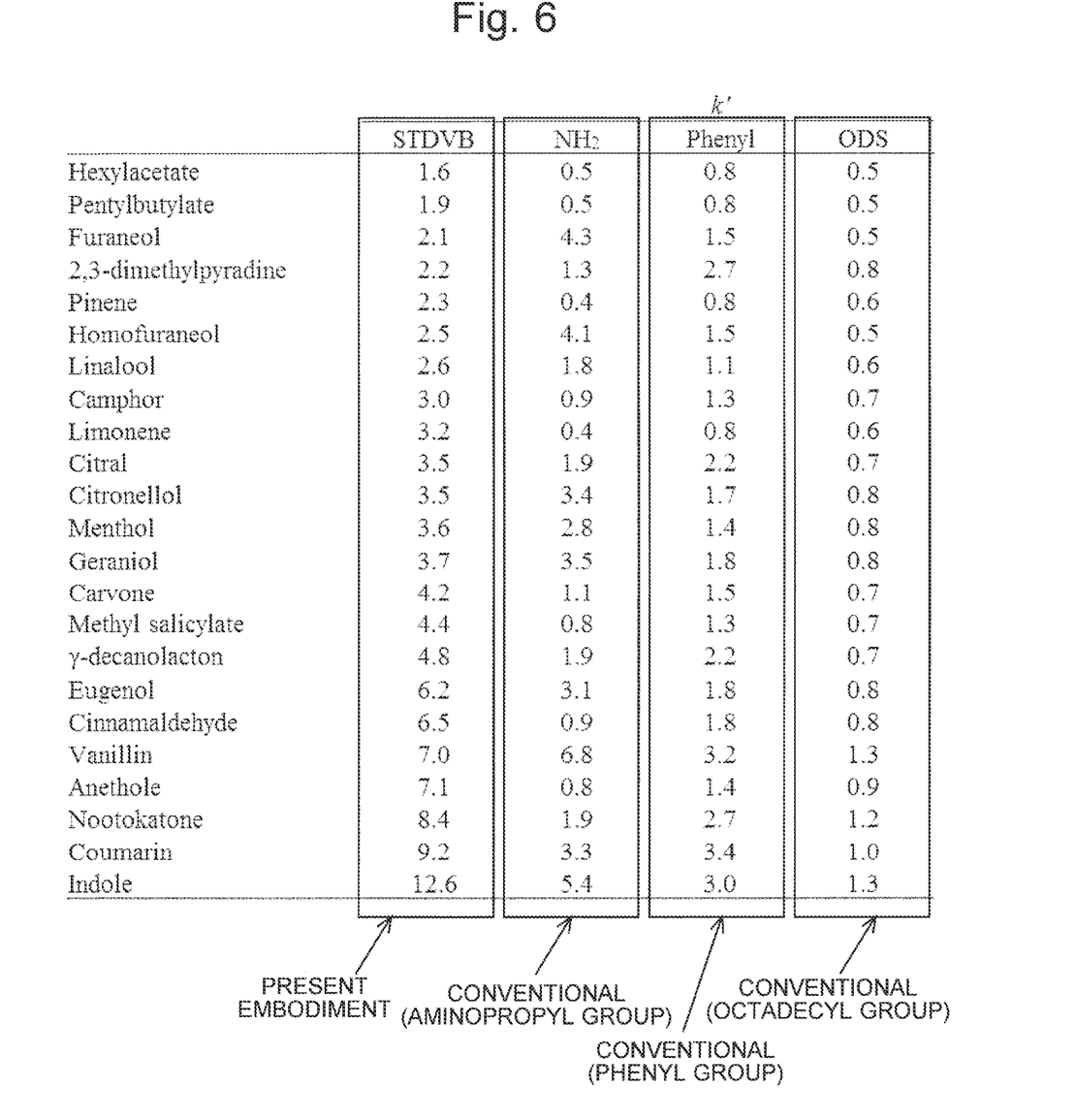
FIG. 6 is a table showing the retention factor of each odorous compound determined from chromatograms obtained by conventional methods for separating an odorous compound as well as a method according to the present embodiment.

FIG. 2 is a chromatogram showing the result of the separation of the odorous compounds by a conventional supercritical fluid chromatograph including a column packed with silica gel chemically modified with an octadecyl group. FIG. 3 is a chromatogram showing the result of the separation of the odorous compounds by a conventional supercritical fluid chromatograph including a column packed with silica gel chemically modified with a phenyl group. FIG. 4 is a chromatogram showing the result of the separation of the odorous compounds by a conventional supercritical fluid chromatograph including a column packed with silica gel chemically modified with an aminopropyl group. By comparison, FIG. 5 is a chromatogram showing the result of the separation of the odorous compounds by the supercritical fluid chromatograph according to the present embodiment. FIG. 6 is a table showing the retention factor k' of each odorous compound calculated from the chromatograms shown in FIGS. 2-5.

In FIG. 2 (in which silica gel chemically modified with an octadecyl group was used as the packing material), all of the 23 kinds of odorous compounds flowed out within a period of 1.0-2.0 minutes in retention time and are almost unseparated. In FIG. 3 (in which silica gel chemically modified with a phenyl group was used as the packing material), although the odorous compounds are more separated than in FIG. 2, all odorous compounds flowed out within a period of 1.0-4.0 minutes in retention time, so their separation is still insufficient. In FIG. 4 (in which silica gel chemically modified with an aminopropyl group was used as the packing material), although the odorous compounds are more separated than in FIGS. 2 and 3, there is a considerable number of odorous compounds forming a group within a period of 1.0-2.5 minutes in retention time, so their separation is insufficient for the preparative separation of the odorous compounds.

In the chromatogram shown in FIG. 5 obtained by the supercritical fluid chromatograph according to the present embodiment, it is evident from the comparison with FIGS. 2-4 that the odorous compounds are individually separated. There is only a small number of periods of time in which some of the peaks of the odorous compounds overlap each other. Those compounds can be separated by using a different modifier, or by performing a different kind of chromatography after the preparative separation.

The previously described embodiment is a mere example and can be appropriately changed or modified according to the gist of the present invention.

In the previously described embodiment, the spectrometric detector which detects an odorous compound in a non-destructive manner is provided for the preparative separation of the odorous compounds. When the preparative separation of the odorous compounds is unnecessary, a mass analyzer may be provided in place of (or in addition to) the spectrometric detector. The odorous compounds whose peaks partially overlap each other in the chromatogram shown in FIG. 5 may be separated by another chromatograph after they have been collected by the fraction collector 20.

[Modes of Invention]

A person skilled in the art can understand that the previously described illustrative embodiments are specific examples of the following modes of the present invention.

(First Mode)

A method for separating an odorous compound according to the first mode of the present invention includes a process of carrying a sample containing an odorous compound into a column filled with a packing material made of a polymer having an unsaturated hydrocarbon structure, by a flow of a mobile phase which is a supercritical fluid of a predetermined substance.

In the method for separating an odorous compound according to the first mode of the present invention, a column filled with a packing material made of a polymer having an unsaturated hydrocarbon structure is used to separate odorous compounds. In the conventional column which uses silica gel chemically modified with a functional group, a highly polar silanol group is present on the surface of the silica gel. A likely reason for the past failure of the separation of odorous compounds by the silica-gel-based column is that the low-molecular odorous compounds introduced into the column along with the highly diffusive supercritical fluid penetrate the stationary phase and reach the surface of the silica gel, causing an undesirable interaction with the silanol group on the surface of the silica gel. To solve this problem, the first mode of the present invention uses a column filled with a packing material, as the stationary phase, made of a polymer of a compound having an unsaturated hydrocarbon structure. In other words, the entire packing material functions as the stationary phase and includes no functional group that would cause an undesirable interaction, so that the odorous compounds can be separated.

(Second Mode)

In the method for separating an odorous compound according to the second mode of the present invention, which is a specific form of the method for separating an odorous compound according to the first mode, the mobile phase is carbon dioxide in a supercritical state, or carbon dioxide in a supercritical state with a modifier added.

In the method for separating an odorous compound according to the second mode of the present invention, the mobile phase is mainly composed of carbon dioxide in a supercritical state. Carbon dioxide has a critical pressure of 7.38 MPa and a critical temperature of 31.1 degrees Celsius. Since its critical temperature is close to room temperature, and since it is neither flammable nor chemically reactive, carbon dioxide allows measurements to be safely performed. Another advantage is that high-purity products of carbon dioxide are available at low prices.

(Third Mode)

In the method for separating an odorous compound according to the third mode of the present invention, winch is a specific form of the method for separating an odorous compound according to the first or second mode, the packing material is polymer beads, the polymer beads have a degree of swelling that does not exceed 1.4 when the polymer beads absorb tetrahydrofuran as well as when the polymer beads absorb methanol, and the polymer beads contain a cross-linked polymer.

Among the substances used as a mobile phase, tetrahydrofuran is a substance that is particularly likely to cause a resin material to swell. Methanol is a substance widely used as a modifier. In the method for separating an odorous compound according to the third mode of the present invention, since a column packed with polymer beads having low degrees of swelling for both tetrahydrofuran and methanol is used, it is possible to perform measurements using various mobile phases (including those with a modifier added). The internal bond of a cross-linked polymer is stronger than that of a non-cross-linked polymer. The use of the polymer beads containing such a cross-linked polymer lowers the degree of swelling as well as secures the pressure resistance.

(Fourth Mode)

In the method for separating an odorous compound according to the fourth mode of the present invention, which is a specific form of the method for separating an odorous compound according to the third mode, the cross-linked polymer includes one or more kinds of structural units selected from the group consisting of a structural unit originating from divinylbenzene and structural units originating from di(meta)acrylic esters.

In the method for separating an odorous compound according to the fourth mode of the present invention, due to the use of a cross-linked polymer having one or more kinds of structural units selected from a group consisting of a structural unit originating from divinylbenzene and structural units originating from di(meta)acrylic esters, a polymer with a high cross-linking density (a polymer in which structures originating from polyfunctional monomers are contained at a high ratio) can be easily obtained, and the degree of swelling of the polymer beads can be lowered.

(Fifth Mode)

In the method for separating an odorous compound according to the fifth mode of the present invention, which is a specific form of the method for separating an odorous compound according to the third or fourth mode, the degree of cross-linking of the cross-linked polymer is equal to or higher than 50%.

As noted earlier, the use of a polymer having a cross-linking decreases the degree of swelling. There is the tendency that the higher the degree of cross-linking of the polymer is, the lower the degree of swelling of the polymer beads becomes. In the method for separating an odorous compound according to the fifth mode of the present invention, a low degree of swelling can be achieved by using a cross-linked polymer having a degree of cross-linking equal to or higher than 50%.

(Sixth Mode)

In the method for separating an odorous compound according to the sixth mode of the present invention, which is a specific form of the method for separating an odorous compound according to one of the first through fifth modes, the average particle size of the polymer beads is within a range of 1-10 μm.

In the method for separating an odorous compound according to the sixth mode of the present invention, the average particle size of the polymer beads is set to be equal to or smaller than 10 μm, which increases the chance of interaction between the odorous compounds and the stationary phase, and thereby increases the number of theoretical plates of the column. Additionally, the average particle size of the polymer beads is set to be equal to or larger than 1 μm, which prevents the pressure within the column from excessively increasing while the column is in use.

(Seventh Mode)

In a method for analyzing an odorous compound according to the seventh mode of the present invention, an odorous compound separated in the method for separating an odorous compound according to one of the first through sixth modes is further analyzed by chromatography and/or mass spectrometry.

In the method for separating an odorous compound according to the seventh mode of the present invention, when the odorous compounds have not been completely separated by the method according to any one of the first through sixth modes, a more complete separation can be achieved by performing chromatography. Additionally, more detailed information concerning the odorous compounds, such as their molecular structures, can be obtained by performing mass spectrometry.

(Eighth Mode)

A supercritical fluid chromatograph according to the eighth mode of the present invention includes:

an odorous compound database in which measurement data of a plurality of odorous compounds, acquired by a predetermined measurement technique, are recorded:

a column filled with a packing material made of a polymer having an unsaturated hydrocarbon structure;

a supercritical fluid supply section configured to supply the column with a supercritical fluid of a predetermined substance;

a sample injection section located in a passage extending from the supercritical fluid supply section to the column, and configured to inject a sample into the supercritical fluid;

a measurement section configured to sequentially perform a measurement of an effluence from the column by the predetermined measurement technique; and an odorous compound identification section configured to identify an odorous compound contained in the effluence by comparing measurement data acquired by the measurement with the measurement data recorded in the odorous compound database.

By using the supercritical fluid chromatograph according to the eighth mode of the present invention, odorous compounds can be satisfactorily separated from each other, as in the first mode. Additionally, by identifying each of the separated compounds, the presence of an unknown odorous compound which may potentially be contained in the sample can be easily recognized.

REFERENCE SIGNS LIST

1 . . . Supercritical Fluid Chromatograph
11 . . . Cylinder
12 . . . Pressure Pump
13 . . . Liquid Container
14 . . . Pump
15 . . . Mixer
16 . . . Sample Injector
17 . . . Column
171 . . . Column Oven
18 . . . Backpressure Valve
19 . . . Spectrometric Detector
191 . . . Flow Cell
192 . . . Lamp
193 . . . Photodetector
20 . . . Fraction Collector
21 . . . Fraction Container
22 . . . Collector Unit
4 . . . Controlling-Processing Unit
41 . . . Storage Section 411 . . . Odorous Compound Database
421 . . . Measurement Controller
422 . . . Odorous Compound Identifier
5 . . . Input Unit
6 . . . Display Unit

The invention claimed is:

1. A method for separating an odorous compound, comprising a process of carrying a sample containing a plurality of odorous compounds into a column filled with a packing material made of a polymer having an unsaturated hydrocarbon structure, by a flow of a mobile phase which is a supercritical fluid of a predetermined substance.

2. The method for separating an odorous compound according to claim 1, wherein the mobile phase is carbon dioxide in a supercritical state, or carbon dioxide in a supercritical state with a modifier added.

3. The method for separating an odorous compound according to claim 1, wherein:
the packing material is polymer beads;
the polymer beads have a degree of swelling that does not exceed 1.4 when the polymer beads absorb tetrahydrofuran as well as when the polymer beads absorb methanol; and
the polymer beads contain a cross-linked polymer.

4. The method for separating an odorous compound according to claim 3, wherein the cross-linked polymer includes one or more kinds of structural units selected from a group consisting of a structural unit originating from divinylbenzene and structural units originating from di(meta) acrylic esters.

5. The method for separating an odorous compound according to claim 3, wherein a degree of cross-linking of the cross-linked polymer is equal to or higher than 50%.

6. The method for separating an odorous compound according to claim 1, wherein an average particle size of the polymer beads is within a range of 1-10 μm.

7. A method for analyzing an odorous compound, wherein an odorous compound separated by the method according to claim 1 is further analyzed by chromatography and/or mass spectrometry.

8. A supercritical fluid chromatograph, comprising:
an odorous compound database in which measurement data of a plurality of odorous compounds, acquired by a predetermined measurement technique using a supercritical fluid chromatograph, are recorded;
a column filled with a packing material made of a polymer having an unsaturated hydrocarbon structure;
a supercritical fluid supply section configured to supply the column with a supercritical fluid of a predetermined substance;
a sample injection section located in a passage extending from the supercritical fluid supply section to the column, and configured to inject a sample into the supercritical fluid;
a measurement section configured to sequentially perform a measurement of an effluence from the column by the predetermined measurement technique; and
an odorous compound identification section configured to identify a plurality of odorous compounds contained in the effluence by comparing measurement data acquired by the measurement with the measurement data recorded in the odorous compound database.

* * * * *